(12) United States Patent
Alsharif et al.

(10) Patent No.: US 11,709,059 B2
(45) Date of Patent: Jul. 25, 2023

(54) ASYNCHRONOUS EXECUTION GRAPHS FOR AUTONOMOUS VEHICLES

(71) Applicant: Waymo LLC, Mountain View, CA (US)

(72) Inventors: Ouais Alsharif, Mountain View, CA (US); Ian Michael Wilkes, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 457 days.

(21) Appl. No.: 16/726,010

(22) Filed: Dec. 23, 2019

(65) Prior Publication Data

US 2021/0190508 A1 Jun. 24, 2021

(51) Int. Cl.
*G01C 21/30* (2006.01)
*G06F 9/48* (2006.01)
*G06F 9/50* (2006.01)
*G01C 21/34* (2006.01)

(52) U.S. Cl.
CPC .......... *G01C 21/30* (2013.01); *G06F 9/4843* (2013.01); *G06F 9/5038* (2013.01); *G01C 21/3446* (2013.01)

(58) Field of Classification Search
CPC .. G01C 21/30; G01C 21/3446; G05D 1/0088; G06F 9/4843; G06F 9/5038; G06N 5/022
See application file for complete search history.

(56) References Cited

U.S. PATENT DOCUMENTS

| 7,783,681 B1* | 8/2010 | Delsart | G06F 12/0269 707/813 |
| 2015/0193399 A1* | 7/2015 | Woker | H04L 41/02 715/234 |
| 2018/0247197 A1* | 8/2018 | Tucker | G06F 9/5038 |
| 2020/0082026 A1* | 3/2020 | Tian | G06F 16/288 |

OTHER PUBLICATIONS

Abadi et al., "TensorFlow: Large-Scale Machine Learning on Heterogeneous Distributed Systems," retrieved from URL <http://download.tensorflow.org/paper/whitepaper2015.pdf>, Nov. 2015, 19 pages.
flume.apache.org [online], "Flume 1.9.0 User Guide," Jan. 2019, retrieved on Mar. 11, 2020, retrieved from URL <http://flume.apache.org/FlumeUserGuide.html>, 63 pages.

* cited by examiner

*Primary Examiner* — Jeffrey C Boomer
(74) *Attorney, Agent, or Firm* — Fish & Richardson P.C.

(57) ABSTRACT

Methods, systems, and apparatus, including computer programs encoded on computer storage media, for executing the operations represented by an asynchronous execution graph. One of the methods includes receiving data characterizing an asynchronous execution graph comprising one or more subgraphs, wherein each subgraph comprises a plurality of nodes connected by edges, the plurality of nodes comprising a source node, one or more processor nodes, and one or more sink nodes; receiving source data from an external system that corresponds to the source node of a first subgraph in the graph; in response, executing the operations represented by the processor nodes in the first subgraph; and executing the operations represented by each sink node in the first subgraph.

18 Claims, 6 Drawing Sheets

ASYNCHRONOUS EXECUTION GRAPHS FOR AUTONOMOUS VEHICLES

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

SUMMARY

This specification describes how a vehicle, e.g., an autonomous or semi-autonomous vehicle, can execute autonomous driving operations using an asynchronous execution graph.

An asynchronous execution graph, or simply "graph," can include one or more subgraphs, each of which represents operations that are to be performed by the vehicle upon receiving sensor data captured by a sensor system of the vehicle. Each subgraph is composed of nodes connected by edges. The nodes can include a source node, which represents receiving a particular input atom; one or more processing nodes, which each represent performing respective operations; and one or more sink nodes, which each represent publishing an output atom of the subgraph to a system that is external to the subgraph.

In this specification, an atom can be any piece of data that flows between the nodes of a subgraph to be processed by the nodes. For example, an input atom for a subgraph can include a point cloud captured by one or more LIDAR sensors on-board a vehicle. As another example, an input atom for a subgraph can include images captured by one or more cameras on-board a vehicle. As another example, an input atom for a first subgraph can include data that has been processed by a second subgraph; that is, the output atom of the second subgraph is the input atom of the first subgraph.

Once an asynchronous execution graph has been built, the graph can be deployed on a vehicle and can be used by the vehicle to make autonomous or semi-autonomous driving decisions.

Particular embodiments of the subject matter described in this specification can be implemented so as to realize one or more of the following advantages.

In some embodiments described in this specification, the execution of the asynchronous execution graph is deterministic. That is, the outputs of the graph, and the ordering of the outputs, are always the same when given the same inputs in simulation. This determinism makes it easier for developers to identify the effects of a change to the graph. If the outputs of the graph were not deterministic given the same inputs, then isolating the cause of a particular change to the outputs would be difficult. When the graph is deployed both in simulation and on an autonomous vehicle, determinism can also guarantee that you are able to exactly replicate a real-world scenario in simulation, e.g., to train a system of the autonomous vehicle to respond appropriately to a particular scenario that the autonomous vehicle experienced in the real world. At least some of the reason that determinism can be guaranteed is that race conditions in the graph can be systematically protected against, by requiring that all nodes in a subgraph produce either an output or a placeholder, and that the sink nodes publish output atoms in the same order during every execution.

An asynchronous execution graph can allow easy modularization of the operations of an autonomous vehicle. Each sub-component, e.g., subgraphs and processing nodes, can have well-defined inputs and outputs. The graph can also allow for simple additions of new processing nodes or subgraphs, as well as a flexible and transparent configuration of each node. This can allow for a fast development cycle; that is, given the minimal framework overhead, developers can add components to the graph quickly and easily.

A scheduler can schedule different sub-components of a graph to share computational resources, or to be run in parallel on different threads. This can allow the graph to be executed with minimal latency from the time that the sensor data is available to the time that outputs of the graph are produced; for example, the graph can guarantee that outputs are produced in 100 ms or less. For example, the scheduler can place nodes that are more important on accelerators, e.g., GPUs, that ensure that the computation represented by the nodes is executed as quickly as possible.

An asynchronous execution graph can allow for partial execution of the graph; that is, instead of requiring a system to execute every computation represented in a graph, the graph framework allows for the system to execute only selected modules within the graph, e.g., a particular subgraph. This can lead to faster simulations, when only partial computation may be necessary, and thus can lead to faster data extraction.

The asynchronous execution graph can automatically manage asynchronous operations. That is, the operations represented by a given subgraph can be triggered when the source node receives the required input atom.

When represented graphically as a tree structure, an asynchronous execution graph can also be easily understood by developers. Readability can be important as new developers are added to a team and as the graph grows bigger and more complex.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can execute autonomous driving operations using an asynchronous execution graph.

Figure 1:
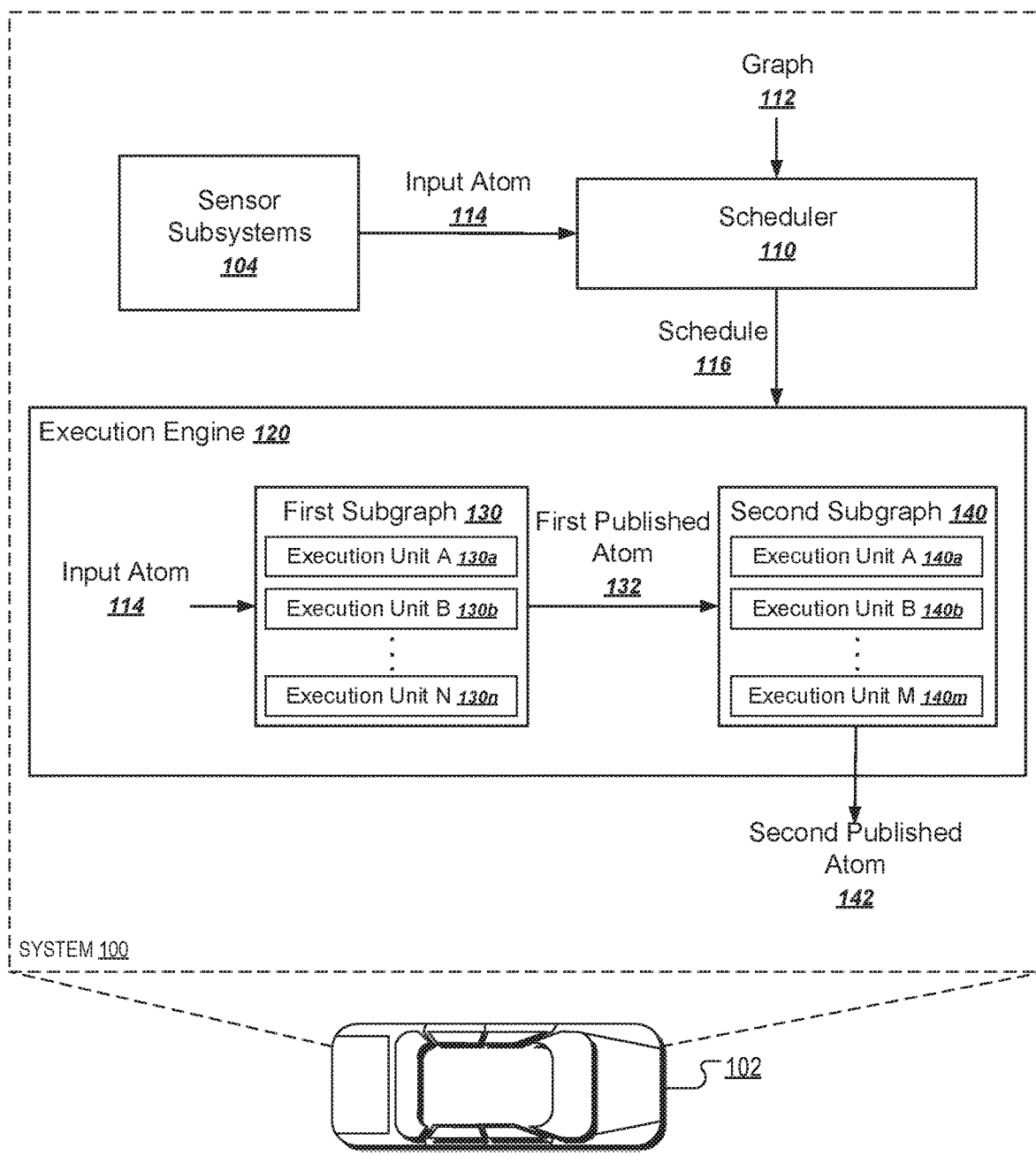
FIG. 1 is a diagram of an example system.

FIG. 1 is a diagram of an example system 100.

The system 100 is located on-board a vehicle 102. The vehicle 102 in FIG. 1 is illustrated as an automobile, but the system 100 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The system 100 includes a number of components, including a scheduler 110 and an execution engine 120. Each of these components can be implemented as computed programs installed on one or more computers onboard the vehicle 102.

The scheduler 110 can receive an asynchronous execution graph 112. The graph 112 represents operations to be executed by the execution engine 120 during the operation of the vehicle 102. The graph 112 can contain one or more subgraphs, where each subgraph is composed of nodes representing operations connected by edges representing the flow of inputs and outputs to the operations represented by the nodes.

The operations represented by a subgraph of the graph 112 or by a node in a subgraph of the graph 112 can include any operation executed during the autonomous or semi-autonomous control of the vehicle 102. As a particular example, a node can represent operations for object detection; that is, the node can receive as input an atom that includes data characterizing an environment surrounding the vehicle, and can generate as output an atom that includes data identifying one or more objects that surround the vehicle, e.g., pedestrians, vehicles, or signs. As another particular example, a node can represent operations for predicting the future path of a surrounding vehicle; that is, the node can receive as input an atom that includes data characterizing the surrounding vehicle at one or more previous time steps, and can generate as output an atom that includes data characterizing a predicted path of the surrounding vehicle at one or more future time steps. As another particular example, a processing node can represent operations for pre-processing data for other nodes; that is, the node can receive as input an atom that includes raw data, and can output an atom that includes processed data that can be used by a subsequent node in the subgraph.

In this specification, nodes are sometimes referred to as executing operations, e.g., receiving data, processing data, and publishing data. This should be understood to mean that the operations represented by the node are executed by a system, e.g., the execution engine 120.

The system 100 includes one or more sensor subsystems 104. The sensor subsystems 104 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

When the sensor subsystems 104 captures new sensor data, the sensor subsystems 104 can determine that the captured sensor data is an input to one or more subgraphs in the graph 112. The sensor subsystems 104 can then send the captured sensor data to the scheduler 110 in the form of an input atom 114. The input atom 114 is an atom that triggers the one or more subgraphs of the graph 112. In this specification, a subgraph is "triggered" by an input atom if the source node of the subgraph is configured to receive the input atom, causing the processing nodes of the subgraph to execute respective operations and the sink nodes of the subgraph to publish respective output atoms.

In some implementations, the system 100 is executed in a simulation; that is, the system 100 is not executed by a real-world vehicle 102 but by a simulated vehicle 102. In these cases, the system 100 can be implemented on one or more computers in the cloud. The sensor subsystems 104 would not be sensors on-board a vehicle, but rather a data store of sensor data that could be provided to the scheduler 110. For example, the data store could maintain historical sensor data captured by vehicles navigating in the real world, and provide the input atom 114 to the scheduler 110 during a simulation of the particular subgraphs of the graph 112 that are triggered by the input atom 114.

The graph architecture ensures that the graph 112 generates the same output regardless of whether the system 100 is deployed on a real-world vehicle or implemented as a simulation.

The nodes in each subgraph of the graph 112 can include a source node, which represents receiving a particular input atom; one or more processing nodes, which each represent performing a respective operation; and one or more sink nodes, which each represent publishing an output atom of the subgraph to a system that is external to the subgraph.

For each subgraph that is triggered by the input atom 114, the scheduler 110 can generate one or more execution units. An execution unit is a self-contained set of computations; for example an execution unit can include all computations represented by a given processing node in the graph 112. For example, a first subgraph 130 of the graph 112 can be triggered by the input atom 114. The scheduler 110 can generate N execution units 130a-n for the first subgraph 130. A sink node of the first subgraph 130 can publish a first published atom 132 that triggers a second subgraph 140. The scheduler can generate M execution units 140a-m for the second subgraph. For each execution unit, the scheduler 110 can define a set of input atoms and output atoms of the execution unit. The output atoms of a particular execution unit can also be called the "operation output" of the execution unit.

The scheduler can select an execution order for each subgraph, using the defined inputs and outputs of each execution unit of the subgraph. The execution order of a subgraph is a predefined order in which the execution units will be executed by the execution engine 120. The execution order can specify that particular execution units be executed in parallel.

In some implementations, the execution order of the execution units is based on a particular topological sorting of the processing nodes of the subgraph. That is, execution units that include processing nodes that are earlier in the particular topological sorting are executed before execution units that include processing nodes that are later in the particular topological sorting. Setting the execution order of a subgraph to be a topological sorting of the nodes of the subgraph automatically satisfies the requirement that all inputs to a given execution unit of the subgraph must be available when the execution unit is executed. In some implementations, the scheduler 110 also uses latency measurements of the processing nodes of the subgraph when selecting an execution order. That is, when two execution nodes could be executed in either order according to their inputs, the scheduler can select a particular order based on respective latencies of the processing nodes in the two execution units.

The scheduler 110 can also select a placement of each execution unit in the execution engine 120. That is, if the execution engine 120 has multiple threads that can execute computations, e.g., an accelerator thread pool and a default pool, the scheduler 110 can select, for each execution unit, which thread the execution unit will be executed on. In some implementations, the scheduler 110 can select a placement of each execution unit based on latency measurements of the processing nodes in the execution units. For example, the scheduler 110 can measure a critical path of the graph; that is, the scheduler 110 can determine the path from the source node of the subgraph to a sink node of the subgraph that will take the longest time. Then, the scheduler 110 can select a placement of those execution units that include nodes in the critical path in order to minimize the time it takes to execute the critical path. For example, the scheduler 110 can prioritize providing computational resources to the execution units that include nodes in the critical path of the subgraph.

When selecting an execution order and placement of the execution units of a subgraph, the scheduler 110 can satisfy the requirement that the computations of the graph 112 are deterministic. That is, if a subgraph of the graph 112 receives the same input atom at two different times, the scheduler 110 ensures that the output atoms of the subgraph are the same at the two different times, and the order in which the output atoms of the subgraph are published is the same at the two different times.

In some implementations, the scheduler 110 selects the same execution order and placement of the execution units of a subgraph every time the subgraph is triggered by an input atom. A deterministic execution order and placement of the execution units necessarily yields a deterministic output.

In some other implementations, the scheduler 110 can select a different execution order and placement of the execution units of a subgraph at different times that the subgraph is triggered. However, the scheduler 110 ensures that the differences between the orderings are not visible to subsystems outside of the execution engine 120. That is, the order in which the operation outputs of particular execution units are generated can be different given the same input atom at different times. However, the operation outputs of the execution units of the subgraph are always the same given the same input atom at different times, and the output atoms of the subgraph itself are always the same given the same input atom at different times. Therefore, from the point of view of an external system that does not have access to the internal state of the subgraph during execution of the subgraph, the subgraph is deterministic.

As a particular example, a subgraph of the graph 112 can have two nodes that do not have any dependency relationship. That is, there does not exist a path from the source node of the subgraph to a sink node of the subgraph that passes through both nodes, if the path only follows forward edges. Forward edges are discussed in more detail below in reference to FIG. 2. Put another way, a first node and a second node do not have a dependency relationship if neither node is a parent node of the other node, nor a grand-parent of the other node (i.e., a parent node of a parent node of the other node), nor a great-grandparent of the other node, and so on. In this case, the scheduler 110 can determine a first execution ordering where the operations represented by the first node are executed before the operations represented by the second node. The scheduler 110 can also determine a second execution ordering where the operations represented by the second node are executed before the operations represented by the first node. The scheduler 110 can also determine a third execution ordering where the operations of the two nodes are executed in parallel. The three execution orderings would not violate the requirement that the computations of the graph 112 be deterministic because the different execution orders would not change the operation outputs of the execution units of the subgraph or the output atoms of the subgraph, because the operations of the two nodes are independent.

As another particular example, if the second subgraph 140 had multiple sink nodes that each published respective published atoms, then the scheduler 110 could determine an ordering and placement of the execution units that ensured that the multiple published atoms of the second subgraph 140 are always published in the same order.

As another particular example, two or more subgraphs of the graph 112 can be triggered at the same time. This can happen when the graph 112 receives two or more input atoms that each trigger respective subgraphs at the same time. This can also happen when the graph 112 receives a single input atom that triggers multiple subgraphs, i.e., the graph 112 has multiple source nodes that each receive as input the same input atom. When multiple subgraphs are triggered at the same time, the scheduler 110 can ensure that the operations of the graph 112 are deterministic by executing the operations of each respective subgraph in a particular sequence. That is, the scheduler 112 can determine an execution order that completely executes the operations of a first subgraph of the multiple triggered subgraphs, then completely executes a second subgraph of the multiple triggered subgraphs, and so on. The scheduler 110 can determine the same ordering of the subgraphs every time the scheduler 110 receives the same group of input atoms at the same time. Determining an execution order that waits for all computations of a particular subgraph to complete before beginning computations of another subgraph ensures that the execution of respective subgraphs does not interfere with one another. For example, if a particular node is in both of two subgraphs and the two subgraphs were executed in parallel, then a race condition might be introduced regarding which subgraph the particular node executes operations for first.

The scheduler provides a generated schedule 116 to the execution engine 120. The schedule 116 can include data characterizing each execution unit, as well as an execution order and placement of each execution unit. The execution engine 120 then executes the operations represented by the first subgraph 130 and the second subgraph 140 according to the schedule 116. That is, the execution engine 120 processes the input atom 114 using the N execution units 130a-n of the first subgraph to generate the first published atom 132. The execution engine can then process the first published atom 132 using the M execution units 140a-m of the second subgraph 140 in order to generate a second published atom 142, which the execution engine 120 can publish to an external subsystem of the system 100.

Figure 2:
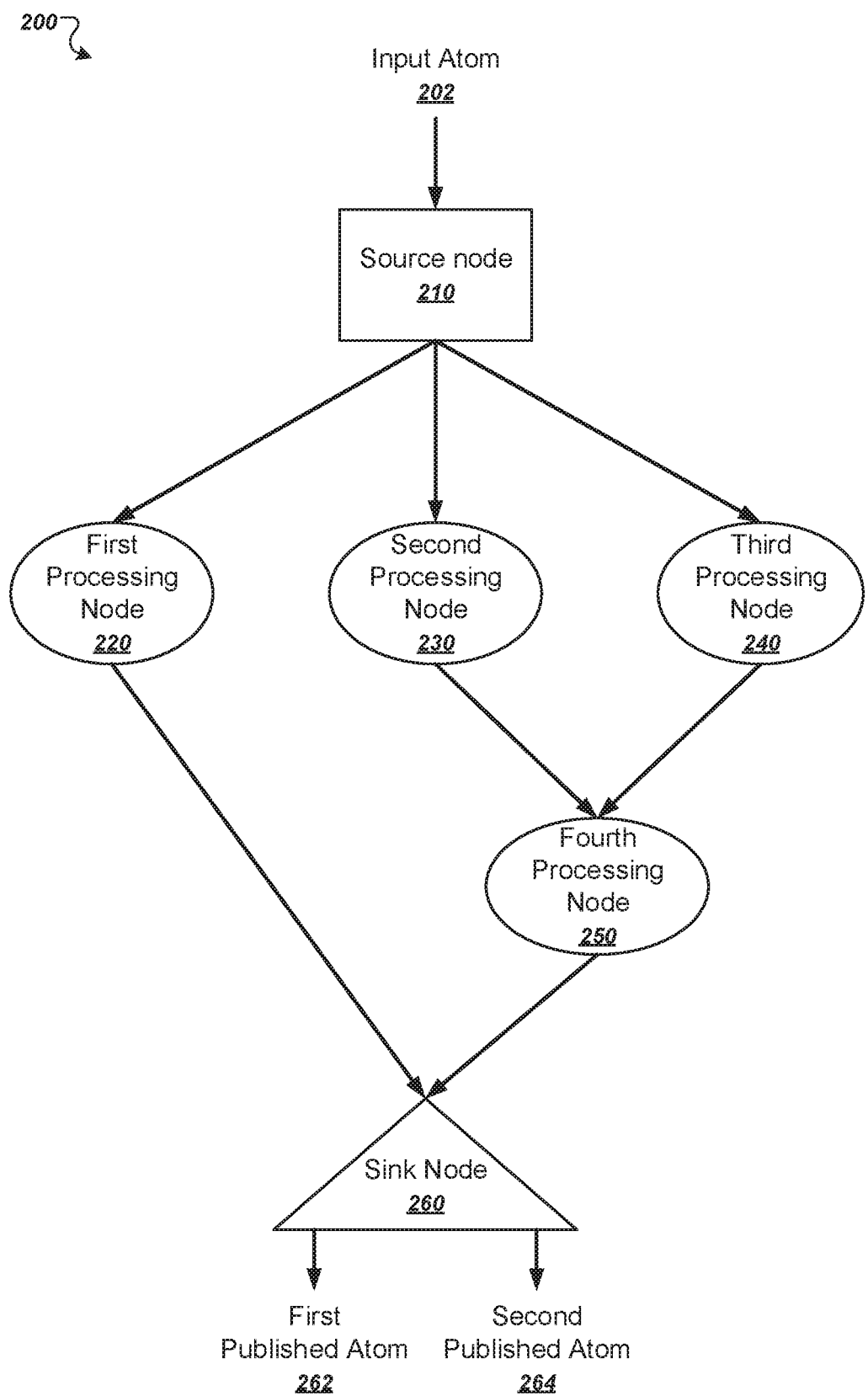
FIG. 2 illustrates an example asynchronous execution graph.

FIG. 2 illustrates an example asynchronous execution graph 200. The graph 200 includes a source node 210, four processing nodes 220, 230, 240, and 250, and a sink node 260. The operations represented by the graph 200 can be executed by a system of one or more computers located in one or more locations. For example, an execution engine, e.g., the execution engine 120 of FIG. 1, appropriately programmed in accordance with this specification, can execute the operations represented by the graph 200. For convenience, an operation may be described as being performed by a given node, indicating that the system can perform the operation with respect to the given node.

Each one-way edge between a parent node and a child node represents an atom being passed from the parent node to the child node. In the graph 200, there are only forward edges that allow data to flow from the source node 210 to the sink node 260. That is, forward edges in a graph define a topological sorting of the nodes in the graph. A topological sorting of a graph with directed edges and no cycles is a linear ordering of the nodes of the graph such that for every directed edge between a first node and a second node, the first node is earlier in the ordering than the second node. Thus, the first node in the topological sorting of an asynchronous execution graph is the source node of the graph, the last node in the topological sorting is a sink node of the graph, and the parent node of every forward edge is earlier in the topological sorting than the child node of the forward edge. Furthermore, the forward edges of an asynchronous execution graph do not define any cycles, because a cycle would make the topological sorting impossible; as a particular example, there is not a first forward edge between a node A and a node B, a second edge between the node B and a node C, and a third forward edge between the node C and the node A. Forward edges allow the parent node to pass immutable data to the child node so that the child node can process the data to produce an output based on the data. Other types of edges will be discussed below in reference to FIG. 4 and FIG. 5.

The source node 210 represents the operation of receiving an input atom 202.

The input atom 202 can be any piece of data that is to be processed by the graph 200. In some implementations, all atoms inherit from the same abstract base class Atom, and all nodes in the graph 200 accept and emit objects whose classes inherit from Atom. In some such implementations, objects that inherit from Atom can be hashed, converted to and from protos, and converted to strings. Allowing objects that inherit from Atom to be hashed can be useful when caching data in simulation, in order to reduce computational overhead. In some implementations, atoms are only passed between nodes directly; that is, in these implementations, atoms are never copied implicitly during execution of the graph 200.

The source node 210, upon receiving the input atom 202, triggers the graph 200 by sending the input atom 202 to the first processing node 220, the second processing node 230, and the third processing node 240.

Each of the processing nodes 220, 230, 240, and 250 represents receiving an input atom, performing computations using the input atom, and generating an output atom. Each processing node has one or more precisely-defined input atoms and one or more precisely-defined output atoms. That is, each processing node always takes inputs of the same type and produces outputs of the same type.

In some implementation, a subset of the input atoms and output atoms for a given processing node can be optional. For example, the fourth processing node 250 receives a first input atom from the second processing node 230 and a second input atom from the third processing node 240. The second input atom from the third processing node 240 can be optional; that is, the fourth processing node 250 does not need the second input atom in order to execute its computations. This means that the third processing node 240 can determine whether or not to execute its computations and send the second input atom to the fourth processing node 250. The third processing node 240 can make this determination based on the input atom 202 that the third processing node 240 receives from the source node 210, as well as predetermined rules for the third processing node 240.

However, if the third processing node 240 determines that it will not execute its computations, the third processing node 240 still sends a placeholder atom to the fourth processing node 250. A placeholder atom is a piece of data sent between a parent node and a child node indicating that the parent node is not executing in the current execution of the graph, and therefore the child node will not receive an output atom from the parent node. For example, the placeholder atom can inherit from the same Atom class that other atoms inherit from, with a method that signals to the child node that the atom is a placeholder atom. If the third processing node 240 did not send a placeholder atom to the fourth processing node 250, then a race condition would be introduced to the graph 200; in particular, if the fourth processing node received the first input atom from the second processing node 230 before receiving the second input atom from the third processing node 240, then the fourth processing node 250 would not know whether to proceed with its computations or to wait for the second input atom from the third processing node 240.

Thus, each processing node waits to receive either an input atom or a placeholder atom from each of its parent nodes. The processing node then determines, according to the inputs it receives and a set of rules for the processing node, whether or not to execute the operations that it represents. If the processing node selects to execute the operations, then it generates one or more output atoms and sends the output atoms to its child nodes. If the processing node selects not to execute the operations, then it generates a placeholder atom and sends the placeholder atom to its child nodes.

In some implementations, each processing node can also access one or more global variables for the graph 200.

In some implementations, a user can encode the structure of the graph in a protocol buffer, instead of in compiled code. A protocol buffer is a file that contains serialized structured data. Importantly, the contents of the protocol buffer can be changed without the need to recompile the rest of the code, e.g., the code that includes the operations of the processing nodes. Thus, users can experiment with the structure of the graph without having to recompile the code for each experiment; this can save a lot of time, because compiling can take a long time when the operations of the graph are sufficiently complex.

In some implementations, the system may monitor how long each node takes to execute its operations. This information can be used by a scheduler later when determining an ordering and a placement of the operations of the nodes in order to minimize latency, e.g., the scheduler 110 depicted in FIG. 1.

The sink node 260 receives a first atom from the first processing node 220 and publishes it to an external system as the first published atom 262. The sink node 160 also receives a second atom from the fourth processing node 250 and publishes it to an external system as the second published atom 264. The sink 260 publishes the first published atom 262 and the second published atom 264 in the same order in every execution of the graph 200, in order to ensure that the execution of the graph 200 is deterministic. That is, even if the sink node 260 receives the second atom from the fourth processing node 250 first, it waits until receiving the first atom from the first processing node 220 before publishing so that the first published atom 262 is always published before the second published atom 264.

In some implementations, the graph 200 can include one or more listeners. A listener is an object in the graph that triggers when a particular subset of the nodes of the graph produce respective outputs. For example, the graph 200 could include a first listener that depends on the first processing node, and a second listener that depends on the third processing node 240 and the fourth processing node 250. Listeners can process the outputs of the nodes that they are triggered by to generate listener output, and can publish the outputs of the nodes and/or the generated listener output to an external system. Listeners do not modify the data flowing through the graph, and nodes do not depend on listeners; thus, the execution of the listeners and the execution of the nodes of the graph can be independent. A system can use listeners to retrieve information about the state of the data in the graph when the graph has only partially executed, as opposed to only observing the input atoms provided to the sources of the graph and the output atoms produced by the sinks of the graph. Observing the state of the graph partway through execution can be important during simulation or training of a machine learning model.

Figure 3:
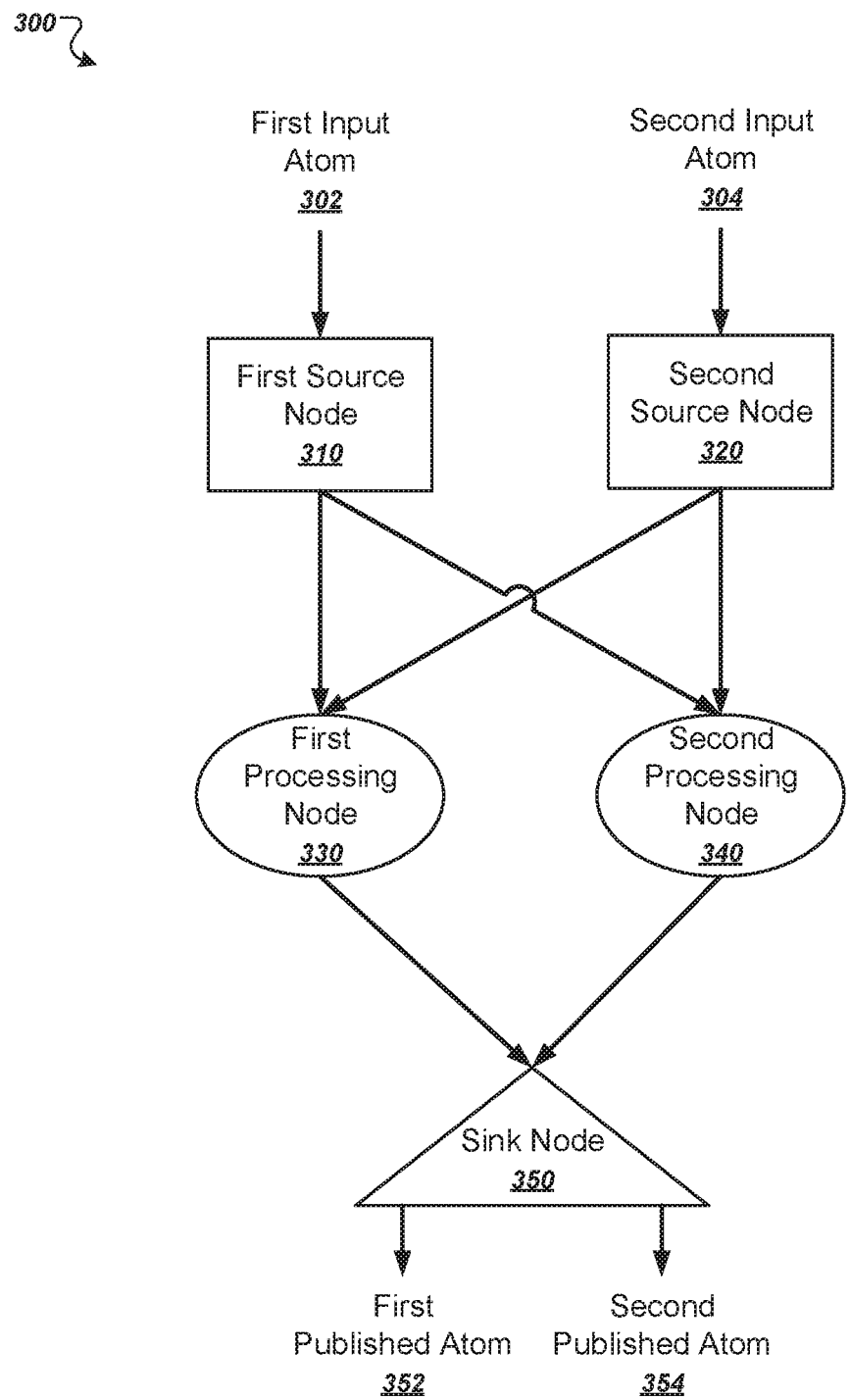
FIG. 3 illustrates an example asynchronous execution graph that has multiple source nodes.

FIG. 3 illustrates an example asynchronous execution graph 300 that has multiple source nodes. The graph 300 includes a first source node 310, a second source node 320, two processing nodes 330 and 340, and a sink node 350.

The first source node 310 receives a first input atom 302 at a first frequency, e.g., 10 Hz. The second source node 320 receives a second input atom 304 at a second frequency, e.g., 100 Hz. Each time either of the source nodes receives an input atom, the first processing node 330 and the second processing node 340 receive the input atom and either execute their respective computations and provide the output to the sink node 250, or determine not to execute their respective computations and provide a placeholder to the sink node 250. That is, the processing nodes do not wait for both parent source nodes 302 and 304 to receive a respective input atom; the processing nodes 330 and 340 fully execute whenever one of their parent source nodes 302 or 304 receives an input atom. Thus, each time either source node receives an input atom, the sink node receives a first atom from the first processing node 330 and publishes it as the first published atom 352, and receives a second atom from the second processing node 340 and publishes it as the second published atom 354. Therefore, the sink node publishes the two published atoms 352 and 354 at a frequency of 110 Hz, i.e., the sum of the frequencies of the first and second source nodes 310 and 320.

In other words, the graph 300 has two subgraphs: a first subgraph whose source node is the first source node 310, and a second subgraph whose source node is the second source node 320. Each subgraph fully executes whenever its source node receives an input atom.

If the first source node 310 and the second source node 320 both receive a respective input atom at the same time, the graph 300 processes each input atom in sequence. In order to guarantee determinism in the output of the graph 300, the graph 300 processes the two input atoms 302 and 304 in the same order every time, e.g., always processing the first input atom 302 before processing the second input atom 304.

A child node that is part of multiple subgraphs, i.e., receives data from multiple source nodes, when it is executing operations for a particular subgraph, only waits for input from those parent nodes that are also in the particular subgraph. That is, if the child node has a parent node that is not in the particular subgraph, the child node does not wait for either an input atom or a placeholder atom from that parent node, because that parent node will never provide an atom as a result of the source node of the particular subgraph receiving data.

Figure 4:
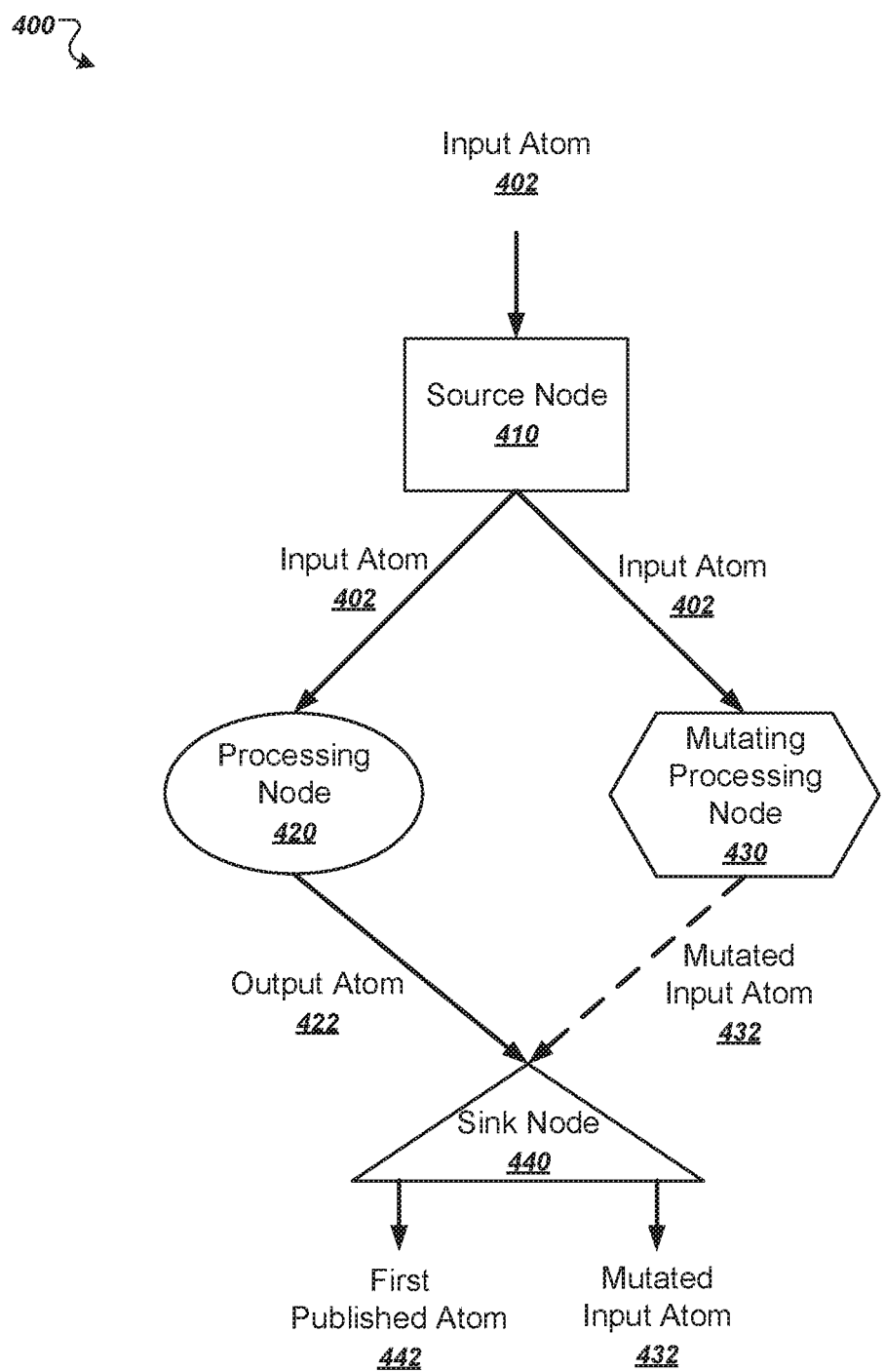
FIG. 4 illustrates an example asynchronous execution graph that has a mutating node.

FIG. 4 illustrates an example asynchronous execution graph 400 that has a mutating processing node. The graph 400 includes a source node 410, a processing node 420, a mutating processing node 430, and a sink node 440.

The source node 410 can receive an input atom 402, and pass the input atom to the processing node 420 and the mutating processing node 430. The processing node performs computations using the input atom 402 as before, and produces an output atom 422 that it passes to the sink node 440. The mutating processing node 430, however, modifies the input atom 402, generating a mutated input atom 432, and passes the mutated input atom 432 to the sink node 440. That is, the mutated input atom 432 is the input atom 402 that has been mutated in-place. By updating the existing input atom 402 instead of creating a new atom, as the processing node 420 did in creating the output atom 422, the mutating processing node 430 can avoid copying the input atom 402, which can be computationally expensive.

Recall that in some implementations, atoms are only passed directly between nodes; that is, atoms are never copied implicitly during execution of the graph 400. In these implementations, the mutating node 430 only executes its computations after the computations of the processing node 420 have been completed. Otherwise, the mutating processing node 430 may mutate the input atom 402 in-place while the processing node 420 is still accessing that location in memory, creating a race condition.

In some implementations, in order to ensure that a mutating processing node does not begin mutating an atom until after all other processing nodes that use the atom have completed, an implicit edge is added between every processing node that takes the atom as input and the mutating processing node. For example, an edge can be added whose parent is the processing node 420 and whose child is the mutating processing node 430, so that the mutating processing node 430 comes after the processing node 420 in a topological sorting of the graph 400. Thus a scheduler, e.g., the scheduler 110 depicted in FIG. 1, would schedule the processing node 420 to execute before the mutating processing node 430.

In some implementations, a given atom can have at most one mutating processing node that mutates it. Otherwise, it is unclear which mutating processing node should mutate the atom in-place first. This could introduce non-determinism into the graph.

Figure 5:
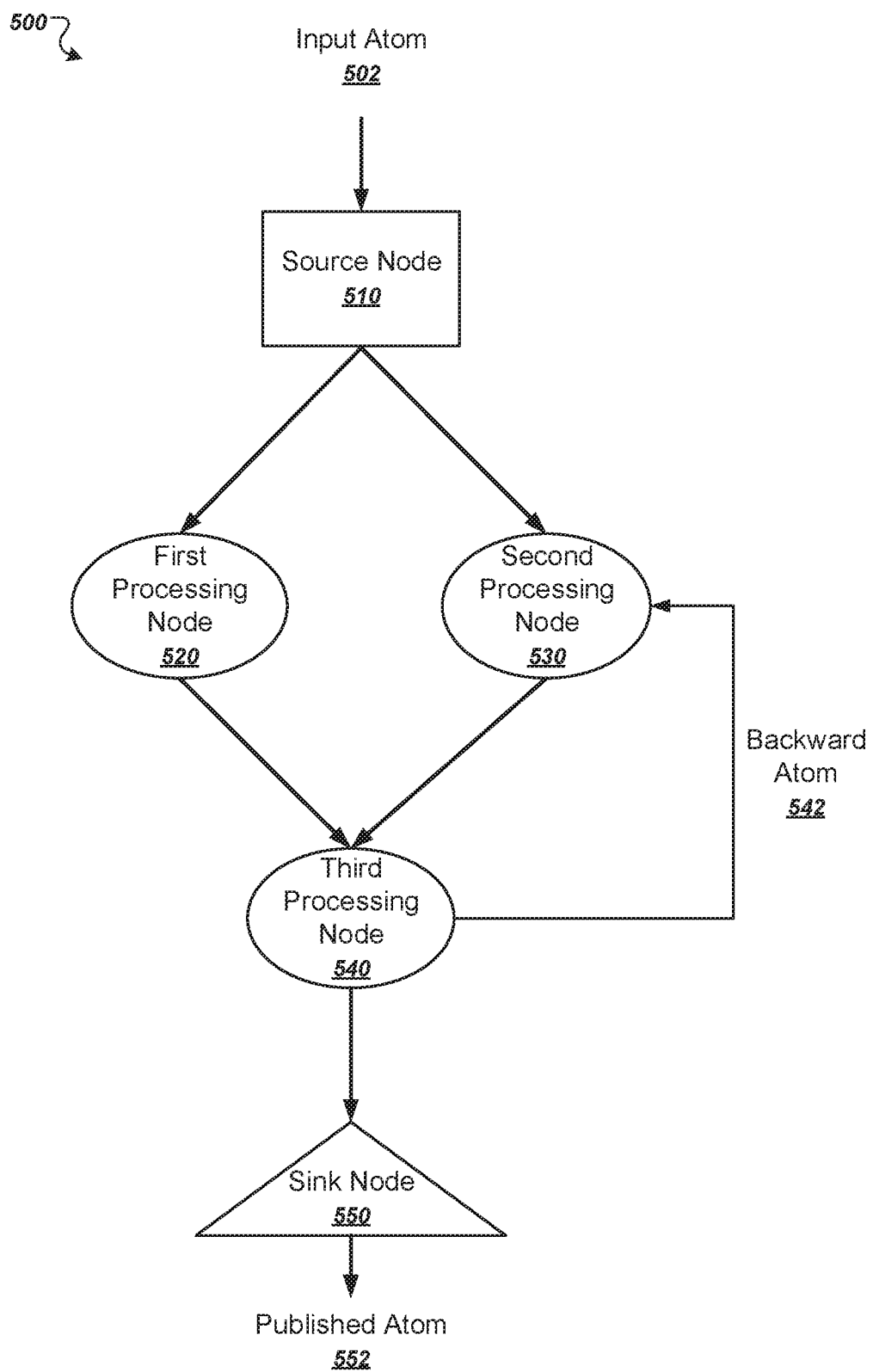
FIG. 5 illustrates an example asynchronous execution graph that has a backwards edge.

FIG. 5 illustrates an example asynchronous execution graph 500 that has a backwards edge. The graph 500 includes a source node 510, two processing nodes 520 and 530, and a sink node 540.

As before the source node 510 receives the input atom 502 and passes it to the first processing node 520 and the second processing node 530. The first and second processing nodes 520 and 530 then each pass an atom to the third processing node 540, which in turn passes one to the sink node 550. The sink node 550 can then publish the published atom 532 to another system that is external to the graph 500.

In addition, the third processing node 540 passes a backward atom 542 along a backward edge to the second processing node 530. A backward edge is an edge whose parent node is later in the topological sort of the graph 500 than the child node of the backward edge. In some cases, the backward atom 542 is the same atom that the third processing node 540 passed to the sink node, i.e. the same as the published atom 552. In some other cases, the backward atom 542 is different from the published atom 552.

The second processing node 530 can use the backward atom 542 to update an internal state of the second processing node 530. Importantly, however, the second processing node cannot generate a new output atom using the backward atom 542, or else an endless cycle of atoms would be exchanged between the second processing node 530 and the third processing node 540. For example, the backward atom 542 can be used during the computation of the second processing node 530 in the next execution of the graph 500, i.e., when the source node 510 receives a second input atom 502.

Figure 6:
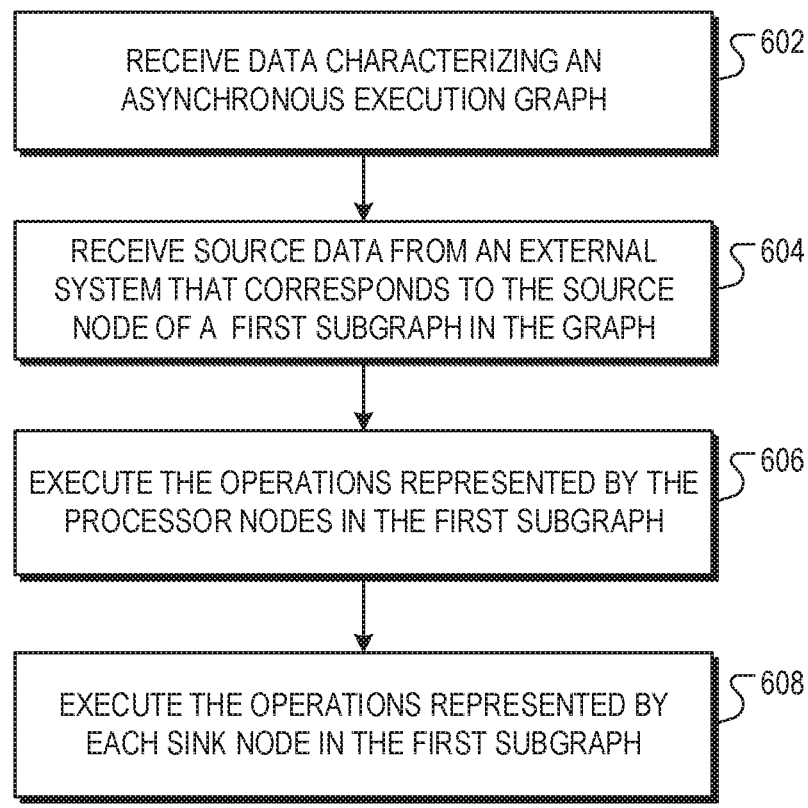
FIG. 6 is a flow diagram of an example process for executing the operations represented by an asynchronous execution graph.

FIG. 6 is a flow diagram of an example process 600 for executing the operations represented by an asynchronous execution graph. For convenience, the process 600 will be described as being performed by a system of one or more computers located in one or more locations. For example, an execution engine, e.g., the execution engine 120 depicted in FIG. 1, appropriately programmed in accordance with this specification, can perform the process 600.

The system receives data characterizing the asynchronous execution graph (step 602). The asynchronous execution graph includes one or more subgraphs, where each subgraph includes multiple nodes connected by edges. The nodes can include a source node, one or more processing nodes, and one or more sink nodes. The nodes can also include one or more mutating processing nodes. The edges can include forward edges, whose parent is earlier than the child in a topological sorting of the subgraph, and backward edges, whose parent is later than the child in the topological sorting of the subgraph.

The system receives source data from an external system that corresponds to the source node of a first subgraph in the graph (step 604). The system passes the source data to its children nodes.

The system executes the operations represented by the processor nodes of the first subgraph (step 606). For each processor node, these operations can include receiving either input data or a placeholder value from each parent node of the processor node. The system can then determine, according to a set of rules of the processor node, whether to execute the operations represented by the processor node. If the system determines to execute the operations, the system generates output data and passes the output data to each of the children of the processing node, along both forward and backward edges. If the system determines not to execute the operations, the system sends a placeholder value to each child node of the processor node, along both forward and backward edges.

The system executes the operations represented by each sink node in the first subgraph (step 608). For each sink node, these operations can include receiving either sink data or a placeholder value from each parent node of the sink node. The system can then determine, according to a set of rules of the sink node, whether to publish the sink data to an external system corresponding to the sink node. If the system determines to publish the sink data, the system provides the sink data to the external system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

In addition to the embodiments described above, the following embodiments are also innovative:

Embodiment 1 is a method comprising:

receiving data characterizing an asynchronous execution graph comprising one or more subgraphs, wherein each subgraph comprises a plurality of nodes connected by edges, the plurality of nodes comprising a source node, one or more processor nodes, and one or more sink nodes, wherein:

the source node represents operations comprising receiving source data from a corresponding external system and providing the source data to one or more processor nodes;

each processor node has one or more parent nodes and one or more child nodes;

each parent node is either the source node of the subgraph or another processor node in the subgraph;

each child node is either a sink node of the subgraph or another processor node in the subgraph, and each processor node represents operations comprising i) receiving input data from the parent nodes of the processor, ii) processing the input data to generate output data, and iii) providing the output data to the child nodes of the subgraph; and each sink node represents operations comprising receiving sink data from one or more parent processor nodes and publishing the sink data to a corresponding external system, and receiving source data from an external system that corresponds to the source node of a first subgraph in the graph;

in response, executing the operations represented by the processor nodes in the first subgraph; and executing the operations represented by each sink node in the first subgraph.

Embodiment 2 is the method of embodiment 1, wherein each subgraph comprises a plurality of edges, the plurality of edges comprising one or more forward edges, wherein:

each forward edge represents a flow of data from a parent node to a child node;

the one or more forward edges define a topological sorting of the nodes in the subgraph, wherein a first node in the topological sorting is the source node of the subgraph and a last node in the topological sorting is a sink node of the subgraph.

Embodiment 3 is the method of embodiment 2, wherein:

the plurality of edges further comprise one or more backward edges, wherein each backward edge represents operations comprising passing backward data from a later node to an earlier node, wherein the earlier node is before the later node in the topological sorting; and the operations represented by each processor node further comprise receiving either backward data or a placeholder value from every later node that shares a backward edge with the processor node.

Embodiment 4 is the method of any one of embodiments 1-3, wherein:

the one or more subgraphs comprise one or more processor nodes that are mutating nodes, wherein each mutating node represents operations comprising mutating input data of one or more parent nodes of the processor in-place; and executing the operations represented by each processor node in the first subgraph comprises executing operations represented by each mutating node, comprising mutating input data of the mutating node in-place after the operations represented by every other processor node that receives as input the input data of the mutating node have completed execution.

Embodiment 5 is the method of any one of embodiments 1-4, wherein each processor node represents operations further comprising:

receiving either input data or a placeholder value from each parent node of the processor node;

determining, according to a set of processor node rules, whether to execute the operations represented by the processor node;

if determining to execute the operations represented by the processor node:

generating output data by executing the operations represented by the processor node, and sending the output data to each child node of the processor node; and if determining not to execute the operations represented by the processor node, sending a placeholder value to each child node of the processor node.

Embodiment 6 is the method of any one of embodiments 1-5, wherein each sink node represents operations further comprising:

receiving either sink data or a placeholder value from each parent node of the sink node;

determining, according to a set of sink node rules, whether to publish the sink data; and if determining to publish the sink data, providing the sink data to a corresponding external system.

Embodiment 7 is a method comprising:

receiving data characterizing an asynchronous execution graph comprising one or more subgraphs, wherein each subgraph comprises a plurality of nodes connected by edges;

receiving, at a first time, a first input from an external system that corresponds to a source node of a first subgraph in the graph;

in response, executing operations represented by the first subgraph to generate a first output, wherein the order of executing the operations has a first execution order;

receiving, at a second time, a second input from the external system that is the same as the first input;

in response, executing the operations represented by the first subgraph to generate a second output, wherein the order of executing the operations has a second execution order that is different from the first execution order; and ensuring that the first output and the second output are the same, comprising ensuring that executing the operations represented by the first subgraph in the first execution order and executing the operations represented by the first subgraph in the second execution order generate the same output.

Embodiment 8 is the method of embodiment 7, wherein executing the operations represented by first subgraph comprises executing operations represented by one or more of the plurality of nodes of the first subgraph in parallel.

Embodiment 9 is the method of any one of embodiments 7 or 8, wherein:

the asynchronous execution graph is deployed on-board a vehicle at the first time, and the asynchronous execution graph is deployed in a simulation of a navigation of a vehicle at the second time.

Embodiment 10 is a system comprising: one or more computers and one or more storage devices storing instructions that are operable, when executed by the one or more computers, to cause the one or more computers to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more processors located on-board a vehicle, comprising:
receiving data characterizing an asynchronous execution graph comprising one or more subgraphs,
wherein each subgraph comprises a plurality of nodes connected by edges, the plurality of nodes comprising a source node, one or more processor nodes, and one or more sink nodes, wherein:
the source node represents operations comprising receiving source data from a corresponding external system and providing the source data to one or more processor nodes;
each processor node has one or more parent nodes and one or more child nodes;
each parent node is either the source node of the subgraph or another processor node in the subgraph;
each child node is either a sink node of the subgraph or another processor node in the subgraph, and
each processor node represents operations comprising i) receiving input data from the parent nodes of the processor node, ii) processing the input data to generate output data, and iii) providing the output data to the child nodes of the subgraph; and
each sink node represents operations comprising receiving sink data from one or more parent processor nodes and publishing the sink data to a corresponding external system, and
receiving source data from an external system that corresponds to the source node of a first subgraph in the graph;
in response, executing the operations represented by the first subgraph, comprising, for each processor node:
determining whether to execute the operations represented by the processor node; and
in response to determining not to execute the operations represented by the processor node, sending a placeholder value to each child node of the processor node, wherein the placeholder value is a piece of data indicating that a parent node of the child node to which the placeholder value is sent is not executing the operations represented by the parent node during the execution of the first subgraph; and
executing the operations represented by each sink node in the first subgraph.

2. The method of claim 1, wherein each subgraph comprises a plurality of edges, the plurality of edges comprising one or more forward edges, wherein:
each forward edge represents a flow of data from a parent node to a child node; and
the one or more forward edges define a topological sorting of the nodes in the subgraph, wherein a first node in the topological sorting is the source node of the subgraph and a last node in the topological sorting is a sink node of the subgraph.

3. The method of claim 2, wherein:
the plurality of edges further comprise one or more backward edges, wherein each backward edge represents operations comprising passing backward data from a later node to an earlier node, wherein the earlier node is before the later node in the topological sorting; and
the operations represented by each processor node further comprise receiving either backward data or a placeholder value from every later node that shares a backward edge with the processor node.

4. The method of claim 1, wherein:
the one or more subgraphs comprise one or more processor nodes that are mutating nodes, wherein each mutating node represents operations comprising mutating input data of one or more parent nodes of the mutating node; and
executing the operations represented by each processor node in the first subgraph comprises executing operations represented by each mutating node, comprising mutating input data of the mutating node after the operations represented by every other processor node that receives as input the input data of the mutating node have completed execution.

5. The method of claim 1, wherein
determining whether to execute the operations represented by the processor node comprises determining, according to a set of processor node rules, whether to execute the operations represented by the processor node; and
executing the operations represented by the first subgraph further comprises, for each processor node:
in response to determining to execute the operations represented by the processor node:
generating output data by executing the operations represented by the processor node, and
sending the output data to each child node of the processor node.

6. The method of claim 1, wherein each sink node represents operations further comprising:
receiving either sink data or a placeholder value from each parent node of the sink node;
determining, according to a set of sink node rules, whether to publish the sink data; and
if determining to publish the sink data, providing the sink data to a corresponding external system.

7. The method of claim 1, wherein the plurality of nodes comprises one or more listeners, wherein:
each listener is triggered by a corresponding subset of the plurality of nodes in the sub-graph and represents operations comprising:
determining whether the nodes in the corresponding subset have produced outputs; and
in response to determining that the nodes in the corresponding subset have produced outputs, publishing an output to a corresponding external system.

8. A system located on-board a vehicle, wherein the system comprises one or more computers and one or more storage devices storing instructions that are operable, when executed by the one or more computers, to cause the one or more computers to perform operations comprising:
receiving data characterizing an asynchronous execution graph comprising one or more subgraphs,
wherein each subgraph comprises a plurality of nodes connected by edges, the plurality of nodes comprising a source node, one or more processor nodes, and one or more sink nodes, wherein:
the source node represents operations comprising receiving source data from a corresponding external system and providing the source data to one or more processor nodes;

each processor node has one or more parent nodes and one or more child nodes;
each parent node is either the source node of the subgraph or another processor node in the subgraph;
each child node is either a sink node of the subgraph or another processor node in the subgraph, and
each processor node represents operations comprising i) receiving input data from the parent nodes of the processor node, ii) processing the input data to generate output data, and iii) providing the output data to the child nodes of the subgraph; and
each sink node represents operations comprising receiving sink data from one or more parent processor nodes and publishing the sink data to a corresponding external system, and
receiving source data from an external system that corresponds to the source node of a first subgraph in the graph;
in response, executing the operations represented by the first subgraph, comprising, for each processor node:
determining whether to execute the operations represented by the processor node; and
in response to determining not to execute the operations represented by the processor node, sending a placeholder value to each child node of the processor node, wherein the placeholder value is a piece of data indicating that a parent node of the child node to which the placeholder value is sent is not executing the operations represented by the parent node during the execution of the first subgraph; and
executing the operations represented by each sink node in the first subgraph.

9. The system of claim 8, wherein each subgraph comprises a plurality of edges, the plurality of edges comprising one or more forward edges, wherein:
each forward edge represents a flow of data from a parent node to a child node; and
the one or more forward edges define a topological sorting of the nodes in the subgraph, wherein a first node in the topological sorting is the source node of the subgraph and a last node in the topological sorting is a sink node of the subgraph.

10. The system of claim 9, wherein:
the plurality of edges further comprise one or more backward edges, wherein each backward edge represents operations comprising passing backward data from a later node to an earlier node, wherein the earlier node is before the later node in the topological sorting; and
the operations represented by each processor node further comprise receiving either backward data or a placeholder value from every later node that shares a backward edge with the processor node.

11. The system of claim 8, wherein:
the one or more subgraphs comprise one or more processor nodes that are mutating nodes, wherein each mutating node represents operations comprising mutating input data of one or more parent nodes of the mutating node; and
executing the operations represented by each processor node in the first subgraph comprises executing operations represented by each mutating node, comprising mutating input data of the mutating node after the operations represented by every other processor node that receives as input the input data of the mutating node have completed execution.

12. The system of claim 8, wherein
determining whether to execute the operations represented by the processor node comprises determining, according to a set of processor node rules, whether to execute the operations represented by the processor node; and
executing the operations represented by the first subgraph further comprises, for each processor node:
in response to determining to execute the operations represented by the processor node:
generating output data by executing the operations represented by the processor node, and
sending the output data to each child node of the processor node.

13. The system of claim 8, wherein each sink node represents operations further comprising:
receiving either sink data or a placeholder value from each parent node of the sink node;
determining, according to a set of sink node rules, whether to publish the sink data; and
if determining to publish the sink data, providing the sink data to a corresponding external system.

14. One or more non-transitory computer readable storage media located on-board a vehicle and encoded with computer program instructions that when executed by a plurality of computers cause the plurality of computers to perform operations comprising:
receiving data characterizing an asynchronous execution graph comprising one or more subgraphs,
wherein each subgraph comprises a plurality of nodes connected by edges, the plurality of nodes comprising a source node, one or more processor nodes, and one or more sink nodes, wherein:
the source node represents operations comprising receiving source data from a corresponding external system and providing the source data to one or more processor nodes;
each processor node has one or more parent nodes and one or more child nodes;
each parent node is either the source node of the subgraph or another processor node in the subgraph;
each child node is either a sink node of the subgraph or another processor node in the subgraph, and
each processor node represents operations comprising i) receiving input data from the parent nodes of the processor node, ii) processing the input data to generate output data, and iii) providing the output data to the child nodes of the subgraph; and
each sink node represents operations comprising receiving sink data from one or more parent processor nodes and publishing the sink data to a corresponding external system, and
receiving source data from an external system that corresponds to the source node of a first subgraph in the graph;
in response, executing the operations represented by the first subgraph, comprising, for each processor node:
determining whether to execute the operations represented by the processor node; and
in response to determining not to execute the operations represented by the processor node, sending a placeholder value to each child node of the processor node, wherein the placeholder value is a piece of data indicating that a parent node of the child node to which the placeholder value is sent is not executing the operations represented by the parent node during the execution of the first subgraph; and executing the operations represented by each sink node in the first subgraph.

15. The non-transitory computer readable storage media of claim 14, wherein each subgraph comprises a plurality of edges, the plurality of edges comprising one or more forward edges, wherein:
   each forward edge represents a flow of data from a parent node to a child node; and
   the one or more forward edges define a topological sorting of the nodes in the subgraph, wherein a first node in the topological sorting is the source node of the subgraph and a last node in the topological sorting is a sink node of the subgraph.

16. The non-transitory computer readable storage media of claim 15, wherein:
   the plurality of edges further comprise one or more backward edges, wherein each backward edge represents operations comprising passing backward data from a later node to an earlier node, wherein the earlier node is before the later node in the topological sorting; and
   the operations represented by each processor node further comprise receiving either backward data or a placeholder value from every later node that shares a backward edge with the processor node.

17. The non-transitory computer readable storage media of claim 14, wherein:
   the one or more subgraphs comprise one or more processor nodes that are mutating nodes, wherein each mutating node represents operations comprising mutating input data of one or more parent nodes of the; and
   executing the operations represented by each processor node in the first subgraph comprises executing operations represented by each mutating node, comprising mutating input data of the mutating node after the operations represented by every other processor node that receives as input the input data of the mutating node have completed execution.

18. The non-transitory computer readable storage media of claim 14, wherein
   determining whether to execute the operations represented by the processor node comprises determining, according to a set of processor node rules, whether to execute the operations represented by the processor node; and
   executing the operations represented by the first subgraph further comprises, for each processor node:
      in response to determining to execute the operations represented by the processor node:
         generating output data by executing the operations represented by the processor node, and
         sending the output data to each child node of the processor node.

* * * * *